United States Patent
Sato

(10) Patent No.: US 9,919,936 B2
(45) Date of Patent: Mar. 20, 2018

(54) WATER RECOVERY METHOD

(71) Applicant: Samsung Electronics Co., Ltd., Suwon-Si, Gyeonggi-Do (KR)

(72) Inventor: Yuya Sato, Yokohama (JP)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 871 days.

(21) Appl. No.: 14/081,165

(22) Filed: Nov. 15, 2013

(65) Prior Publication Data

US 2014/0138313 A1 May 22, 2014

(30) Foreign Application Priority Data

Nov. 16, 2012 (JP) .................................. 2012-252182
Oct. 28, 2013 (KR) ......................... 10-2013-0128717

(51) Int. Cl.
  *C02F 1/44* (2006.01)
  *B01D 61/00* (2006.01)
(52) U.S. Cl.
  CPC ............ *C02F 1/445* (2013.01); *B01D 61/002* (2013.01); *B01D 2311/06* (2013.01);
  (Continued)
(58) Field of Classification Search
  CPC .... B01D 61/002; B01D 61/005; B01D 61/58; B01D 2311/06; B01D 2311/08; B01D 2315/10; B01D 2315/16; B01D 2317/02; B01D 2317/022; C02F 1/001; C02F 1/445; C02F 2103/08
  See application file for complete search history.

(56) References Cited

U.S. PATENT DOCUMENTS 8,029,671 B2 10/2011 Cath et al.
2006/0144789 A1* 7/2006 Cath .................... B01D 61/002
                                                              210/641

(Continued)

FOREIGN PATENT DOCUMENTS

JP    57-012802 A    1/1982
JP    2008307447 A   12/2008

(Continued)

OTHER PUBLICATIONS

Tzahi Y. Cath, Osmotically and thermally driven membrane processes for enhancement of water recovery in desalination processes, Desalination and Water Treatment 15 (2010) 279-286.*

(Continued)

*Primary Examiner* — Pranav N Patel
(74) *Attorney, Agent, or Firm* — Harness, Dickey & Pierce, P.L.C.

(57) ABSTRACT

A water recovery method for improving water recovery efficiency may include inflowing a low concentration solution including water into an in-series flow path. The in-series flow path may include a plurality of flow paths for a low concentration solution coupled in series. The method may additionally include inflowing a high concentration solution having the same concentration into a plurality of flow paths for a high concentration solution. Each of the plurality of flow paths for the high concentration solution may be connected to each of plurality of flow paths for the low concentration solution via a respective semipermeable membrane being interposed therebetween.

17 Claims, 5 Drawing Sheets

(52) U.S. Cl.
CPC ...... *B01D 2311/08* (2013.01); *B01D 2313/10* (2013.01); *B01D 2317/022* (2013.01); *B01D 2317/06* (2013.01)

(56) References Cited

U.S. PATENT DOCUMENTS

| | | | |
|---|---|---|---|
| 2007/0151925 A1* | 7/2007 | de los Reyes | B01D 61/14 210/641 |
| 2010/0224476 A1 | 9/2010 | Cath et al. | |
| 2011/0044824 A1* | 2/2011 | Kelada | F03G 7/005 417/53 |
| 2011/0084025 A1 | 4/2011 | Tominaga et al. | |
| 2011/0233137 A1 | 9/2011 | Cath et al. | |
| 2012/0211423 A1 | 8/2012 | Kim et al. | |

FOREIGN PATENT DOCUMENTS

| | | | |
|---|---|---|---|
| JP | 2009092564 A | | 4/2009 |
| JP | 2011255339 A | | 12/2011 |
| KR | 101110341 B1 | | 2/2012 |
| KR | 20120073080 A | | 7/2012 |
| KR | 20120095293 A | | 8/2012 |
| KR | 101184651 B1 | | 9/2012 |
| WO | WO-2007147013 A1 | | 12/2007 |
| WO | WO2011040889 | * | 4/2011 |

OTHER PUBLICATIONS

Wang et al.; Characterization of novel forward osmosis hollow fiber membranes, Journal of Membrane Science 355 (2010) 158-167.*

* cited by examiner

WATER RECOVERY METHOD

CROSS-REFERENCE TO RELATED APPLICATIONS

This application claims priority under 35 U.S.C. § 119 to Japanese Patent Application No. 2012-252182, filed in the Japanese Patent Office on Nov. 16, 2012, and Korean Patent Application No. 10-2013-0128717, filed in the Korean Intellectual Property Office on Oct. 28, 2013, the entire contents of each of which are incorporated herein by reference.

BACKGROUND

1. Field

The present disclosure relates to a water recovery method for beverage water or industrial water. More particularly, the present disclosure generally relates to a water recovery method for water from a natural system (for example, water obtained from a sea, river, lake, swamp, pond, and the like), wherein the water may be, for example, sea water, brackish water, river water, and the like, industrial drain water, various water drained from homes, and the like.

2. Description of the Related Art

A water recovery process (method) by an FO (forward osmosis) method is considered to lessen the energy consumption required for water recovery compared with a water recovery process by a RO (reverse osmosis) method. Accordingly, in recent times, developments on a water recovery process by an FO method have been actively made. Herein, the water recovery process by an FO method includes partitioning a low concentration solution (a solution subject to water recovery, for example sea water), and a high concentration solution having a higher osmotic pressure than the low concentration solution with a forward osmotic membrane, and inflowing water of the low concentration solution into the high concentration solution.

Specifically, in a water recovery process by an FO method, water of the low concentration solution flows into the high concentration solution using an FO membrane module. Herein, the FO membrane module includes a flow path for a low concentration solution where a low concentration solution is distributed, a flow path for a high concentration solution where a high concentration solution is distributed, and a forward osmotic membrane partitioning the flow path for a low concentration solution and the flow path for a high concentration solution. The high concentration solution may also be referred to be as a draw solution (DS). The water is recovered from the high concentration solution.

In a water recovery process by an FO method, because water moves spontaneously from a low concentration solution to a high concentration solution unlike a water recovery process by an RO method, it is not necessary to apply pressure to the low concentration solution.

Accordingly, the water recovery process by an FO method may lessen energy consumption for water recovery compared with the water recovery process by an RO method.

On the other hand, in a water recovery process by an FO method, FO membrane modules are coupled in series and thereby a large amount of low concentration solution may be treated. This process may be referred to be as a multiple water recovery process. In a conventional multiple water recovery process, a flow path for a low concentration solution and a flow path for a high concentration solution are respectively coupled in series. In addition, in the conventional multiple water recovery process, a low concentration solution is distributed in an in-series flow path for a low concentration solution including flow paths for a low concentration solution coupled in series, while high concentration solution is distributed in an in-series flow path for a high concentration solution including flow paths for a high concentration solution coupled in series.

However, in the conventional multiple water recovery process, as the number of steps from an inlet of an in-series flow path for a low concentration solution to an FO membrane module increases, an osmotic pressure difference between a low concentration solution and a high concentration solution in an FO membrane module decreases. This is because, as the number of steps from the inlet of the in-series flow path for a low concentration solution to an FO membrane module increases, the concentration of the low concentration solution in an FO membrane module becomes higher, and the concentration of the high concentration solution becomes lower. As the osmotic pressure difference between a low concentration solution and a high concentration solution decreases, an amount of water that flows from the low concentration solution to the high concentration solution decreases. Accordingly, in the conventional multiple water recovery process, water recovery efficiency decreases in an FO membrane module at a rear end, and furthermore recovery efficiency of the whole process also decreases.

A method of increasing a flow rate of a high concentration solution has been suggested to solve the above problem. However, this method requires high pump energy to distribute the massive amount of the high concentration solution. In addition, since water needs to be recovered from the massive amount of the high concentration solution, inconvenience of recovering water from the high concentration solution is increased. Thus, the method may not fundamentally solve the aforementioned problem.

SUMMARY

In a multiple water recovery method using forward osmosis, a water recovery method may include inflowing a low concentration solution including water into an in-series flow path including a plurality of first flow paths for a low concentration solution coupled in series, and inflowing a high concentration solution having the same concentration into a plurality of second flow paths for a high concentration solution, each of which being connected to each of the first flow paths for a low concentration solution via a respective semipermeable membrane being interposed therebetween.

An osmotic pressure difference in each FO membrane module (a module consisting of a flow path for a low concentration solution, a flow path for a high concentration solution, and a semipermeable membrane partitioning them), particularly an osmotic pressure difference in an FO membrane module at a rear end, may be maintained at a relatively high level. Therefore, water recovery efficiency in the FO membrane module at a rear end is remarkably improved. Furthermore, the recovery efficiency of an entire water recovery method is remarkably improved.

An outlet flow rate of the in-series flow path for the low concentration solution may be higher than the sum of the inlet flow rate of each of the plurality of second flow paths for the high concentration solution.

Because a flow rate of the high concentration solution is much less than the low concentration solution, pump energy required for supplying the high concentration solution is very low. In addition, the inconvenience to recover water from the high concentration solution may be lessened.

An inlet flow rate of the in-series flow path for the low concentration solution may be higher than the sum of the inlet flow rate of each of the plurality of second flow paths for the high concentration solution.

Because a flow rate of the high concentration solution is much less than that of the low concentration solution, the pump energy required for supplying the high concentration solution is very low. In addition, the inconvenience to recover water from the high concentration solution may be lessened.

In addition, the flow path for a high concentration solution may be narrower than the flow path for a low concentration solution by disposing a semipermeable membrane in the flow path for a high concentration solution.

Because of the narrower flow path, a flux of the high concentration solution in the flow path for a high concentration solution is improved, and furthermore, concentration polarization in the high concentration solution is decreased.

In addition, a permeability coefficient of the semipermeable membrane may be increased, as the number of steps from an inlet of an in-series flow path to the semipermeable membrane is increased.

The permeability coefficient of an FO membrane increases as the number of steps from an inlet of an in-series flow path to the semipermeable membrane increases, and thus the amount of water passing each FO membrane, that is, a load of the water, is standardized.

The low concentration solution may be sea water.

Water may be recovered from sea water with a relatively high recovery efficiency.

In a multiple water recovery method using forward osmosis, a water recovery method ma also include inflowing a low concentration solution including water into an in-series flow path including a plurality of first flow paths for a low concentration solution coupled in series, and inflowing a high concentration solution into a plurality of second flow paths for a high concentration solution, each of which being connected to each of the plurality of first flow paths for a low concentration solution via a respective semipermeable membrane being interposed therebetween, wherein the high concentration solution has higher concentration as the number of steps from an inlet of the in-series flow path to the flow path for a high concentration solution is larger.

According to the non-limiting embodiment, an osmotic pressure difference in each FO membrane module becomes more uniform.

DETAILED DESCRIPTION

Figure 1:
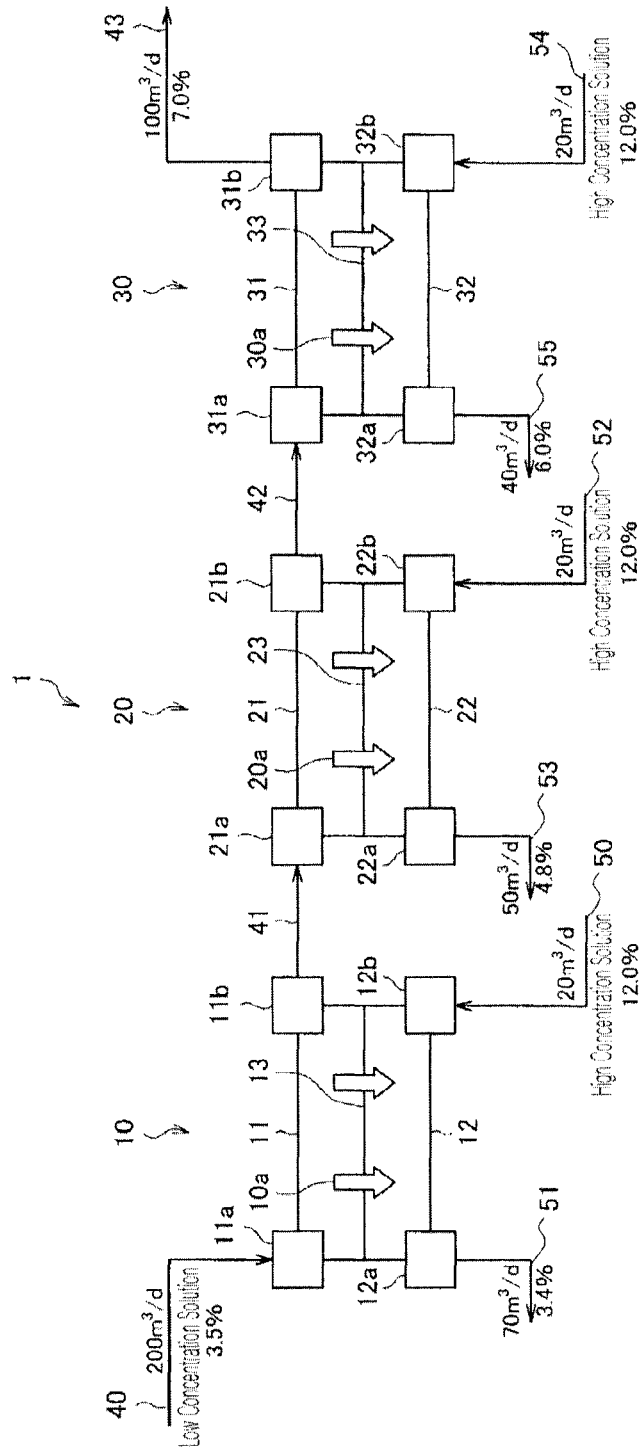
FIG. 1 is a block diagram showing a multiple structure of a water recovery device according to Embodiment 1.

Hereinafter, example embodiments are described in further detail with reference to the drawings.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In the present specification and drawings, the same reference numbers are assigned for constituent elements having substantially equivalent functions, and thus duplicated descriptions thereof are omitted. Hereinafter, a concentration (mass %) of a solute refers to mass % of a solute relative to a total mass of a solution. FO membranes (forward osmotic membranes) used in each FO membrane module in embodiments may be any membrane, for example an FO membrane, an RO membrane, an NF membrane, and the like which are available as semipermeable membranes. Herein, a semipermeable membrane is theoretically a membrane passing water molecules due to an osmotic pressure difference, but not passing all the solutes, and actually not passing almost all the solutes.

<1. Background>

According to the embodiments, provided are multiple water recovery devices 1, 2, and 3 and a multiple water recovery process (method) using the multiple water recovery devices 1, 2, and 3 according to the following embodiments by examining a background technology, that is, water recovery technology using an FO method. Accordingly, first of all, the background technology for the following embodiments is illustrated.

(Water Recovery Device Using Single Module)

Figure 4:
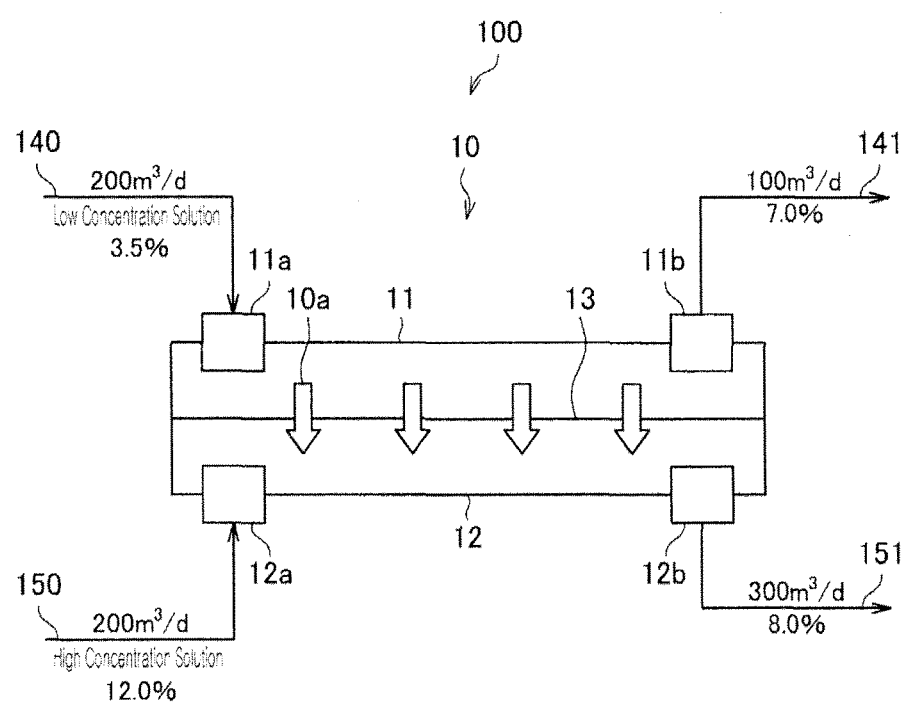
FIG. 4 is a block diagram showing a conventional structure of a water recovery device.

First, a structure of a water recovery device 100 using a single module is described referring to FIG. 4.

The water recovery device 100 is one using an FO method, where water from a low concentration solution of water (fresh water) is flowed into a high concentration solution. The water recovery device 100 includes an FO membrane module 10, connecting flow paths 140 and 141 for the low concentration solution, and connecting flow paths 150 and 151 for the high concentration solution.

The FO membrane module 10 includes a flow path 11 for the low concentration solution, connectors 11a and 11b for the low concentration solution, a flow path 12 for the high concentration solution, connectors 12a and 12b for the high concentration solution, and an FO membrane 13. The flow path 11 is for distributing the low concentration solution, and the low concentration solution is distributed in the flow path 11 in a parallel direction with the FO membrane 13 (a rightward direction of FIG. 4). Herein, the low concentration solution is a solution including water, that is to say, an aqueous solution.

The connectors 11a and 11b are respectively an inlet and an outlet for the low concentration solution. In this embodiment, the connector 11a is an inlet for the low concentration solution, and the connector 11b is an outlet for the low concentration solution. That is, the low concentration solution flows in from the connector 11a to the flow path 11 and is distributed in the flow path 11. The low concentration solution is released from the connector 11b outside the flow path 11.

The flow path 11 is connected to the flow path 12 through the FO membrane 13. In other words, the flow path 11 and the flow path 12 are partitioned by the FO membrane 13 in the FO membrane module 10. The flow path 12 is for distributing the high concentration solution, and the high concentration solution is distributed in the same direction (in a rightward direction in FIG. 4) as the low concentration solution in the flow path 12. Herein, the high concentration solution is a solution including water, that is to say, an aqueous solution. In addition, the high concentration solution includes a solute in a higher concentration than that of the low concentration solution, that is, has a higher osmotic pressure than that of the low concentration solution. The high concentration solution may also be referred to be as a draw solution (DS).

The connectors 12a and 12b are respectively an inlet and an outlet for the high concentration solution. In this embodiment, the connector 12a is an inlet for the high concentration solution, and the connector 12b is an outlet for the high concentration solution. That is, the high concentration solution flows in from the connector 12a to the flow path 12, and is distributed in the flow path 12. The high concentration solution is released through the connector 12b to be discharged outside the flow path 12.

The FO membrane 13 partitions the flow path 11 for a low concentration solution and the flow path 12 for a high concentration solution. In addition, the high concentration solution has higher osmotic pressure than the low concentration solution, and thus water in the low concentration solution naturally flows into the high concentration solution. In other words, the water in the low concentration solution moves in an arrow direction 10a through the FO membrane 13 and flows into the flow path 12. Accordingly, energy required to move water from the low concentration solution to the high concentration solution theoretically becomes zero (0).

The connecting flow path 140 is a pipe connecting a source of the low concentration solution to the connector 11a. The connecting flow path 141 is a pipe connected to the connector 11b for releasing the low concentration solution released from the connector 11b out of the water recovery device 100.

The connecting flow path 150 is a pipe connecting a source of the high concentration solution to the connector 12a. The connecting flow path 151 is a pipe connected to the connector 12b and feeds the high concentration solution released from the connector 12b into a DS (draw solution) regeneration device. The DS regeneration device is, for example, an RO membrane device, and recovers water from the high concentration solution and simultaneously sends the concentrated high concentration solution (i.e., a regenerated high concentration solution) back to the source of the high concentration solution.

(Water Recovery Process Using Single Module)

Next, a water recovery process using the water recovery device 100 is explained.

In this water recovery process, the low concentration solution flows in the flow path 11 from the connector 11a, while the high concentration solution flows in the flow path 12 for a high concentration solution to the connector 12a. Accordingly, water in the low concentration solution flows into the high concentration solution through the FO membrane 13. After separating the water, the concentrated low concentration solution is released from the connector 11b.

On the other hand, the high concentration solution is less concentrated with water from the low concentration solution, and flows in the same direction as the low concentration solution through the flow path 12 and is externally released from the connector 12b. Then, the high concentration solution is fed into the DS regeneration device, and the DS regeneration device recovers water from the high concentration solution. After recovering the water, the concentrated high concentration solution is sent back to the source of the high concentration solution. Through the above treatment, water in the low concentration solution is recovered.

For example, as shown in FIG. 4, the low concentration solution in a solute concentration (hereinafter simply referred to as [concentration]) of 3.5 mass % flows in the flow path 11 at a flow rate of 200 m$^3$/day, and the low concentration solution in a concentration solution of 7.0 mass % is released from the flow path 11 at a flow rate 100 m³/day. A solute used in this embodiment is NaCl. That is, the low concentration solution is sea water. On the other hand, the high concentration solution flows in the flow path 12 in a concentration of 12.0 mass % at a flow rate of 200 m³/day, and the high concentration solution is released from the flow path 12 in a concentration of 8.0 mass % at a flow rate of 300 m³/day. A solute in this embodiment is $MgCl_2$, so called polyvalent ions. Accordingly, since water of the low concentration solution at a flow rate of 200 m³/day flows into the high concentration solution at a flow rate of 100 m³/day, recovery efficiency of the water is about 50%. The water flowing into the high concentration solution is recovered by the DS regeneration device.

On the other hand, as shown in FIGS. 1 to 5, the FO membrane shows an ideal blocking rate, that is, 100%, as a simulation result. In other words, water recovery efficiency becomes ideal and may have a small error from actual recovery efficiency. However, the water recovery process according to the embodiment is even actually better than that of the comparative example, and in addition, a person of ordinary skill in the art may realize the process in embodiments and examples.

(Multiple Structure of Water Recovery Device)

When a low concentration solution is massively present, a water recovery device 100 using the aforementioned single module takes a long time to treat the low concentration solution. Accordingly, a water recovery device using a plurality of modules (multiple modules) may be required for the massive amount of the low concentration solution.

Figure 5:
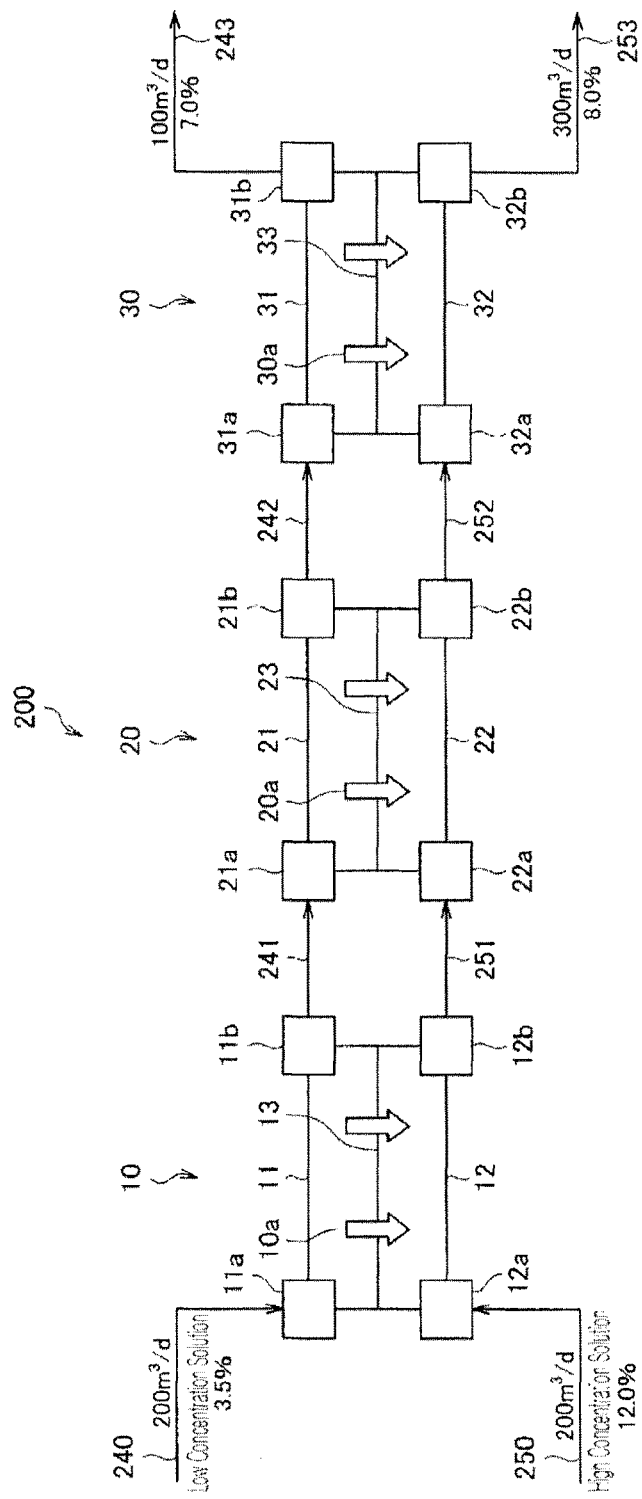
FIG. 5 is a block diagram showing a conventional multiple structure of a water recovery device.

FIG. 5 shows an example of a water recovery device using a plurality of modules, for example a water recovery device 200. The water recovery device 200 schematically includes flow paths 11, 21, and 31 for a low concentration solution and flow paths 12, 22, and 32 for a high concentration solution of a plurality of FO membrane modules 10, 20, and 30, which are coupled in series.

More specifically, the water recovery device 200 includes FO membrane modules 10, 20, and 30, connecting flow paths 240, 241, 242, and 243 for a low concentration solution, and connecting flow paths 250, 251, 252, and 253 for a high concentration solution.

The FO membrane module 10 has the structure described above.

The FO membrane module 20 includes a flow path 21 for a low concentration solution, connectors 21a and 21b for a low concentration solution, a flow path 22 for a high concentration solution, connectors 22a and 22b for a high concentration solution, and an FO membrane 23.

The FO membrane module 30 includes a flow path 31 for a low concentration solution, connectors 31a and 31b for a low concentration solution, a flow path 32 for a high concentration solution, connectors 32a and 32b for a high concentration solution, and an FO membrane 33. The FO membrane modules 20 and 30 have the same function as the FO membrane module 10.

The arrows 20a and 30a in the FO membrane modules 20 and 30 indicate a direction in which water moves.

The connecting flow path 240 is a pipe connecting a source of the low concentration solution to the connector 11a, and the connecting flow path 241 is a pipe connecting the connector 11b to the connector 21a for the low concentration solution.

The connecting flow path 242 is a pipe connecting the connector 21b to the connector 31a.

The connecting flow path 243 is a pipe connected to the connector 31b and externally releases the low concentration solution released from the connector 31b out of the water recovery device 200.

In this way, the flow paths 11, 21, and 31 are coupled in series through the connecting flow paths 241 and 242.

In other words, an in-series flow path, that is, an in-series flow path for a low concentration solution, is formed through the connecting flow paths 241 and 242 and flow paths 11, 21, and 31. In a water recovery device including a plurality of FO membrane modules like the water recovery device 200, the FO membrane modules are counted as first, second, third, . . . from an inlet of an in-series flow path for a low concentration solution, that is, an FO membrane module near the connector 11a. In the embodiment as shown in FIG. 5, the FO membrane module 10 is a first module, and the FO membrane module 20 is a second module.

The connecting flow path 250 is a pipe connecting the source of the high concentration solution to the connector 12a, and the connecting flow path 251 is a pipe connecting the connector 12b with the connector 22a.

The connecting flow path 252 is a pipe connecting the connector 22b with the connector 32a.

The connecting flow path 253 is a pipe connected to the connector 32b and feeds the high concentration solution released from the connector 32b into the DS regeneration device. The DS regeneration device has the aforementioned function.

In this way, the flow paths 12, 22, and 32 are coupled in series through the connecting flow paths 251 and 252.

In other words, an in-series flow path, that is, an in-series flow path for a high concentration solution, is formed through the connecting flow paths 251 and 252 for the high concentration solution and connecting flow paths 12, 22, and 32 for the high concentration solution.

(Water Recovery Process Using Multiple Module)

Next, a water recovery process using the water recovery device 200, that is, a multiple water recovery process, is illustrated.

In this water recovery process, a low concentration solution flows in an inlet of an in-series flow path for a low concentration solution, that is, from the connector 11a to the flow path 11, while a high concentration solution flows in an inlet of an in-series flow path for a high concentration solution, that is, the connector 12a to the flow path 12. Accordingly, water in the low concentration solution flows into the high concentration solution through the FO membrane 13. After separating the water, the concentrated low concentration solution is released from the connector 11b into the connecting flow path 241. The low concentration solution flows into the flow path 21 from the connector 21a through the connecting flow path 241 for a low concentration solution.

On the other hand, the high concentration solution is less concentrated by the water from the low concentration solution and flows in the flow path 12 in the same direction as the low concentration solution and is released from the connector 12b to the connecting flow path 251. The high concentration solution flows in the connecting flow path 251 and then flows from the connector 22a to the flow path 22. Then, the high concentration solution is treated the same in the FO membrane modules 20 and 30 as the FO membrane module 10.

Finally, the low concentration solution is externally released from the connector 31b, and the high concentration solution is externally released from the connector 32b. The high concentration solution is fed into a DS regeneration device, and the DS regeneration device recovers water in the high concentration solution. After recovering the water, the concentrated high concentration solution is sent back to the source of the high concentration solution. In this way, water in the low concentration solution is recovered.

For example, as shown in FIG. 5 (the comparative example), a low concentration solution in a solution concentration of 3.5 mass % flows in the flow path 11 at a flow rate of 200 m³/day, and a low concentration solution in a concentration of 7.0 mass % is released from the flow path 11 at a flow rate 100 m³/day. On the other hand, a high concentration solution in a concentration of 12.0 mass % flows in the flow path 12 at a flow rate of 200 m³/day, and a high concentration solution in a concentration solution of 8.0 mass % is released from the flow path 12 at a flow rate of 300 m³/day. Accordingly, water flows from the low concentration solution to the high concentration solution at a flow rate of 100 m³/day. A solute in the low concentration solution and the high concentration solution is the same as in FIG. 4, and the FO membranes 13, 23, and 33 are TFC-FO membranes made by HTI Inc. The water flowing in the high concentration solution is recovered by a DS regeneration device. The number of FO membrane modules may be determined by the amount of the low concentration solution. In addition, each FO membrane module may include a plurality of FO membrane devices.

(Problems of Conventional Multiple Water Recovery Process)

In a conventional multiple water recovery process, as the number of steps from an inlet of an in-series flow path for a low concentration solution to an FO membrane module becomes larger, an osmotic pressure difference between low and high concentration solutions in the FO membrane module becomes smaller. The reason is that the low concentration solution module has a higher concentration while the high concentration solution has a lower concentration in the FO membrane as the number of steps from an inlet of an in-series flow path for a low concentration solution to an FO membrane module becomes larger. As an osmotic pressure difference between low and high concentration solutions becomes smaller, less water flows from the low concentration solution to the high concentration solution.

Accordingly, water recovery efficiency in the FO membrane module at a rear end, that is, utilization efficiency (Flux) of the FO membrane is reduced, and furthermore, recovery efficiency over the conventional multiple water recovery process is reduced. In other words, the conventional multiple water recovery process may have equivalent efficiency to that of the embodiment by increasing the size and number of the FO membrane modules.

Attempts to solve this problem have in general used a method of increasing the flow rate of a high concentration solution. However, this method requires a large amount of pump energy to distribute the high concentration solution in a massive amount. In addition, since the high concentration solution in a massive amount is used to recover water, inconvenience of recovering water from the high concentration solution is increased. Accordingly, this method may not fundamentally solve the aforementioned problem.

The present disclosure develops a multiple water recovery device and a multiple water recovery process by repeatedly examining the problem. The water recovery device and water recovery process according to one example embodiment may improve recovery efficiency. Hereinafter, the water recovery device and water recovery process are illustrated in detail.

<2. Embodiment 1>
(Structure of Water Recovery Device)

First, a structure of a water recovery device 1 according to Embodiment 1 is explained referring to FIG. 1.

The water recovery device 1 schematically includes a flow path for a high concentration solution in parallel compared with a water recovery device 200 shown in FIG. 5.

More specifically, the water recovery device 1 includes FO membrane modules 10, 20, and 30, connecting flow paths 40, 41, 42, and 43 for a low concentration solution, and connecting flow paths 50, 51, 52, 53, 54, and 55 for a high concentration solution.

The FO membrane module 10 includes a flow path 11 for a low concentration solution, connectors 11a and 11b for a low concentration solution, a flow path 12 for a high concentration solution, connectors 12a and 12b for a high concentration solution, and an FO membrane 13. The flow path 11 is for distributing a low concentration solution, and the low concentration solution is distributed in the flow path 11 in a parallel direction with the FO membrane 13 (a rightward direction of FIG. 1).

Herein, the low concentration solution is a solution including water, that is, an aqueous solution. The low concentration solution to be treated by the water recovery device 1 may be any solution as long as it includes water. The low concentration solution may be, for example, water from a natural system, for example water obtained from a sea, river, lake, swamp, pond, and the like, for example sea water, blackish water, river water, and the like, industrial drain water, various water drained from homes, and the like.

The connectors 11a and 11b are respectively an inlet and an outlet for a low concentration solution. In this embodiment, the connector 11a is an inlet for the low concentration solution, and the connector 11b is an outlet for the low concentration solution. In other words, the low concentration solution flows in from the connector 11a into the flow path 11, and is distributed in the flow path 11 in a rightward direction of FIG. 1. The low concentration solution is released from the connector 11b outside the flow path 11.

The flow path 12 is connected to the flow path 11 by disposing the FO membrane 13 therebetween. In other words, the flow path 11 and the flow path 12 in the FO membrane module 10 are partitioned by the FO membrane 13.

The flow path 12 is a flow path for distributing the high concentration solution, and the high concentration solution in the flow path 12 is distributed in a reverse direction (in the leftward direction in FIG. 1) with the low concentration solution.

In this way, the high and low concentration solutions oppositely flow in the FO membrane module 10. Accordingly, an osmotic pressure difference in the FO membrane module 10 becomes more uniform in a length direction (leftward and rightward directions in FIG. 1) of the FO membrane module 10. On the other hand, the high and low concentration solutions may be distributed to flow in parallel (in the same direction). However, the opposite flow may bring about higher water recovery efficiency.

The high concentration solution includes water, that is, an aqueous solution. In addition, the high concentration solution includes a solute in a higher concentration than in the low concentration solution, that is, the osmotic pressure is higher than in the concentration of the low concentration solution. The high concentration solution may also be referred to be as a draw solution (DS).

A kind of a solute dissolved in the high concentration solution is not particularly limited. For example, the solute may include monovalent or polyvalent ions. The polyvalent ions are desirable because they increase osmotic pressure of the high concentration solution. A high concentration solution including the polyvalent ion is referred to be as an MVI (multivalent ion)-based DS.

The MVI may be, for example, calcium chloride, magnesium chloride, magnesium sulfate, magnesium nitrate, and the like. A DS electrolyte including monovalent ions may be, for example, sodium chloride, potassium chloride, potassium nitrate, sodium bicarbonate, and the like.

Other desirable example of the solute may be carbon dioxide, ammonia, and the like. These are gases and thus may be easily removed from the high concentration solution. In other words, water may be easily recovered from the high concentration solution. For example, these solutes may be removed from the high concentration solution by slightly heating the same. The high concentration solution removed of the solutes is substantially water, thereby easily recovering the water. On the other hand, when a solute is a subject (for example, a salt including the aforementioned polyvalent ions), an RO membrane module and the like may be used to recover water from the high concentration solution as described above. Accordingly, a large amount of energy is needed. The solute may be used singularly or in a mixture. For example, when the solute is mixed with ammonia and carbon dioxide, solubility of carbon dioxide may be improved.

The connectors 12a and 12b are respectively an outlet and an inlet for the high concentration solution. In this embodiment, the connector 12b is an inlet for a high concentration solution, and the connector 12a is an outlet for the high concentration solution. In other words, the high concentration solution flows in from the connector 12b into the flow path 12, and is distributed in the flow path 12. The high concentration solution is released from the connector 12a outside the flow path 12.

The FO membrane 13 partitions the flow path 11 and the flow path 12. In addition, since the high concentration solution has a higher osmotic pressure than the low concentration solution, water in the low concentration solution naturally flows into the high concentration solution. In other words, the water in the low concentration solution moves in an arrow direction (10a) through the FO membrane 13 and flows into the flow path 12. Accordingly, energy required to move water from the low concentration solution to the high concentration solution is theoretically zero (0).

The FO membrane 13 may include a conventional semipermeable membrane, for example, an FO membrane, an RO membrane, an NF membrane, and the like without a particular limit. The FO membrane may include, for example, a cellulose 3 acetate membrane made by Hydration Technologies Inc. (HTI) or a composite membrane (a TFC membrane), but may also include an RO membrane such as a mixed cellulose acetate membrane of 2 acetic acid and 3 acetic acid, CE or CG made by General Electric (GE), SWC series or CTA series as a polyamide-based composite membrane made by Hydranautics Inc., ESPA series, LFC series, SW series, BW series, HRLE series, XRE series, and the like as a polyamide-based composite membrane made by DOW.

On the other hand, the FO membrane 13 may be a membrane having high hydrophilicity, to which impurities from the low concentration solution may not be easily attached.

On the other hand, FO membranes having a different permeability coefficient are provided by HTI Inc. These FO membranes may have a permeability coefficient of 9 LMH (L/m²/h) (1 M NaCl vs. distilled water), 20 LMH (L/m²/h) (1 M NaCl vs. distilled water), and the like. The higher permeability coefficient the FO membrane has, the more easily water is passed therethrough.

In the post-described Embodiment 3, FO membranes used in each FO membrane module have different permeability coefficients.

The FO membrane module 20 includes a flow path 21 for a low concentration solution, connectors 21a and 21b for a low concentration solution, a flow path 22 for a high concentration solution, connectors 22a and 22b for a high concentration solution, and an FO membrane 23.

The FO membrane module 30 includes a flow path 31 for a low concentration solution, connectors 31a and 31b for a low concentration solution, a flow path 32 for a high concentration solution, connectors 32a and 32b for a high concentration solution, and an FO membrane 33.

The FO membrane modules 20 and 30 have the same function as the FO membrane module 10.

The arrows 20a and 30a indicate a direction in which water moves.

The connecting flow paths 40 to 43 for a low concentration solution have the same structure as the connecting flow paths 240 to 243 for a low concentration solution described above.

Accordingly, the flow paths 11, 21, and 31 for a low concentration solution are coupled in series through the connecting flow paths 41 and 42.

In other words, the connecting flow paths 41 and 42 and the flow paths 11, 21, and 31 form an in-series flow path, that is, an in-series flow path for a low concentration solution. In addition, FO membrane modules are counted first, second, third, . . . from an FO membrane module closest to an inlet of an in-series flow path for a low concentration solution, that is, a connector 11a in the water recovery device 1.

In FIG. 1, the FO membrane module 10 is a first module and the FO membrane module 20 is a second module.

The present example embodiment shows a device including three modules, but it may include any number of modules of more than two if necessary.

The connecting flow path 50 is a pipe connecting a source of the high concentration solution with the connector 12b.

The connecting flow path 51 is a pipe connected to the connector 12a and feeds the high concentration solution released from the connector 12a into a DS regeneration device.

The DS regeneration device may be any device recovering water from the high concentration solution, but, for example, is an RO membrane device when a solute is a salt including polyvalent ions.

On the other hand, when the solute in the high concentration solution is a gas, the DS regeneration device may be a heating device such as a distillation device and the like.

The connecting flow path 52 for a high concentration solution is a pipe connecting a source of the high concentration solution and the connector 22b.

The connecting flow path 53 is a pipe connected to the connector 22a and feeds the high concentration solution released from the connector 22a to the DS regeneration device.

The connecting flow path 54 is a pipe connecting the source of the high concentration solution and the connector 32b.

The connecting flow path 55 is a pipe connected to the connector 32a and feeds the high concentration solution released from the connector 32a into the DS regeneration device.

Accordingly, the connecting flow paths 50, 52, and 54 for a high concentration solution are arranged in parallel in Embodiment 1.

In Embodiment 1, the connecting flow paths 50, 52, and 54 for a high concentration solution distribute the high concentration solution in the same concentration and simultaneously at the same flow rate.

Accordingly, the high concentration solution in the same concentration and simultaneously at the same flow rate flows in the flow paths 12, 22, and 32.

In addition, an outlet flow rate of the in-series flow path for a low concentration solution is higher than the sum of inlet flow rates of each flow path for a high concentration solution.

Herein, an outlet flow rate of the in-series flow path for a low concentration solution is a flow rate of the low concentration solution released from an outlet of the in-series flow path for a low concentration solution, that is, the connector 31b.

In addition, an inlet flow rate of an in-series flow path for a low concentration solution is higher than the sum of inlet flow rates of each flow path for a high concentration solution.

Herein, the inlet flow rate of an in-series flow path for a low concentration solution is a flow rate of the low concentration solution flowing in the inlet of an in-series flow path for a low concentration solution, that is, the connector 11a.

In addition, an inlet flow rate of a flow path for a high concentration solution is a flow rate of the high concentration solution flowing in the connectors 12b, 22b, and 32b for a high concentration solution.

As described above, the high concentration solution is fed into each of the FO membrane modules 10, 20, and 30, for example, by two methods as follows.

First, a flow path from a source of the high concentration solution is branched into the flow paths 50, 52, and 54, and pumps are positioned in the connecting flow paths 50, 52, and 54. These pumps are set to have the same output. Accordingly, each of the connecting flow paths 50, 52, and 54 distributes the high concentration solution in the same concentration and simultaneously at the same flow rate.

Secondly, a pump is disposed in a flow path from a source of the high concentration solution, and the path extending from the pump is branched into the connecting flow paths 50, 52, and 54. The output of the pump is set to be three times higher than in the first method, and a valve and the like is used to adjust the flow rate and to uniformly distribute the high concentration solution to each FO membrane module. Accordingly, the high concentration solution is distributed into each of the connecting flow paths 50, 52, and 54 in the same concentration and at the same flow rate.

However, there may be another method of distributing the high concentration solution into each of the connecting flow paths 50, 52, and 54 in the same concentration and at the same flow rate, other than the two aforementioned methods.

According to the present example embodiment 1, the connecting flow paths 50, 52, and 54 are arranged in parallel and simultaneously distribute the high concentration solution in the same concentration and at the same rate. Accordingly, the high concentration solution in the same concentration and simultaneously at the same flow rate flows in the flow paths 12, 22, and 32 in Embodiment 1. Accordingly, since each FO membrane module, particularly, each FO membrane module 20 and 30 at rear ends maintains a higher osmotic pressure difference than a conventional one, recovery efficiency in these FO membrane modules 20 and 30 is remarkably improved.

In addition, since the flow rate of the high concentration solution is very much lower than the flow rate of the low concentration solution, pump energy required for feeding the high concentration solution becomes very small. In addition, inconvenience of recovering water with the high concentration solution is decreased.

On the other hand, as described above, since the high concentration solution in the same concentration is fed in each of the FO membrane modules 10, 20, and 30, a high osmotic pressure difference in each of the FO membrane modules 10, 20, and 30 is maintained despite lowering a flow rate of the high concentration solution. In other words, since each of the FO membrane modules 10, 20, and 30 maintains a high osmotic pressure difference, the flow rate of the high concentration solution doesn't need to be high.

In addition, since the low concentration solution has an increasing contact area with the high concentration solution, utilization efficiency of the FO membrane is improved. Resultantly, the area of the FO membrane becomes smaller, and simultaneously the number of modules may be decreased.

(Water Recovery Process Using Multiple Module)

Now, a water recovery process, that is, a multiple water recovery process using the water recovery device 1, is illustrated. In this water recovery process, while the low concentration solution is made to flow in an inlet of an in-series flow path, that is, in the flow path 11 from the connector 11a, the high concentration solution in the same concentration and at the same flow rate is made to flow in each inlet of flow paths in parallel for a high concentration solution, that is, the connectors 12b, 22b, and 32b to the flow paths 12, 22, and 32 for a high concentration solution.

Accordingly, the low concentration solution flows in an in-series flow path for a low concentration solution. In addition, water in the low concentration solution flows in the high concentration solution through the FO membranes 13, 23, and 33. The low concentration solution concentrated by separating the water is released through the flow path 43 for a low concentration solution.

On the other hand, the high concentration solution in each of the FO membrane modules 10, 20, and 30 has a lower concentration due to water from the low concentration solution, flows through the flow paths 12, 22, and 32 for a high concentration solution in an opposite direction to the low concentration solution (i.e., reversely), and is released from the connectors 12a, 22a, and 32a into the connecting flow paths 51, 53, and 55 for a high concentration solution. Herein, since the high concentration solution in the same concentration and at the same rate flows in each of the FO membrane modules 10, 20, and 30, an osmotic pressure difference in the FO membrane modules 10, 20, and 30, and in particular, in the FO membrane modules at rear ends 20 and 30, is maintained to be high.

Then, the high concentration solution is fed in a DS regeneration device, and the DS regeneration device recovers water in the high concentration solution. The high concentration solution is concentrated by the water recovery, and then goes back to the source of the high concentration solution.

Through the treatment process, water in the low concentration solution is recovered.

(Example)

As an example, a low concentration solution having a concentration of 3.5 mass % flows in a flow path 11 for a low concentration solution at a flow rate of 200 m$^3$/day in the embodiment shown in FIG. 1. A high concentration solution having a concentration of 12.0 mass % flows in each flow path 12, 22, and 32 for a high concentration solution at a flow rate of 20 m³/day.

Accordingly, a low concentration solution having a concentration of 7.0 mass % is released from the flow path 31 for a low concentration solution at a flow rate of 100 m³/day.

Further, a high concentration solution having a concentration of 3.4 mass % is released from the flow path 12 for a high concentration solution at a flow rate of 70 m³/day.

In addition, a high concentration solution having a concentration of 4.8 mass % is released from the flow path 22 at a flow rate of 50 m³/day.

On the other hand, a high concentration solution having a concentration of 6.0 mass % is released from the flow path 32 at a flow rate of 40 m³/day.

In addition, solutes of the low concentration solution and the high concentration solutions are the same as shown in FIG. 4, and FO membranes 13, 23, and 33 are TFC-FO membranes made by Hydration Technology Innovations (HTI), LLC.

As is clearly shown in the embodiment, the same recovery efficiency as in a conventional method is obtained by using a high concentration solution in a smaller amount than the conventional method.

On the other hand, as the number of steps from the inlet of an in-series flow path for a low concentration solution to an FO membrane module becomes smaller, the flow rate of a high concentration solution released from the FO membrane module into a DS regeneration device becomes higher, and the concentration thereof becomes lower. The reason is that as the number of steps from the inlet of an in-series flow path for a low concentration solution to the FO membrane module becomes smaller, an osmotic pressure difference in the FO membrane module becomes larger. In other words, as the number of steps from the inlet of an in-series flow path for a low concentration solution to the FO membrane module is smaller, water recovery efficiency is higher. However, as the number of steps from the inlet of an in-series flow path for a low concentration solution to the FO membrane module becomes smaller, the FO membrane is more loaded, and is thus easily deteriorated. Accordingly, the post-described Embodiment 3 provides each of the FO membrane modules 10, 20, and 30 having more uniform recovery efficiency to make deterioration of the FO membranes more uniform. Embodiment 3 is now illustrated in more detail.

When also the flow paths for a low concentration solution are arranged in parallel, all of the FO membrane modules 10, 20, and 30 are disposed in parallel. Accordingly, when low and high concentration solutions fed into each of the FO membrane modules 10, 20, and 30 have the same flow rate as that of the high concentration solution in Embodiment 1, a lesser amount of the low and high concentration solutions are fed into each of the FO membrane modules 10, 20, and 30, causing a concentration polarization problem in both of flow paths for low and high concentration solutions. Herein, the concentration polarization indicates formation of a high concentration area around the FO membrane. On the contrary, when a flow rate of the low concentration solution fed into each of the FO membrane modules 10, 20, and 30 becomes equal to that of the low concentration solution according to the present example embodiment, the flow rate increases as much as the number of modules, and in addition, output of pumps prepared for each module needs to be increased, seriously deteriorating energy efficiency.

Accordingly, only the flow paths for a high concentration solution are arranged in parallel in Embodiment 1 to suppress a concentration polarization in each FO membrane module 10, 20, and 30 as much as possible. Concentration polarization in the high concentration solution may be suppressed in Embodiment 2. More detail is illustrated later. The concentration polarization may reduce recovery efficiency.

In this regard, a multiple water recovery process according to Embodiment 1 includes inflowing a low concentration solution into an in-series flow path for a low concentration solution including a plurality of flow paths 11, 21, and 31 for a low concentration solution coupled in series, and inflowing a high concentration solution having the same concentration into each of the flow paths 12, 22, and 32 for a high concentration solution. Accordingly, an osmotic pressure difference in each of the FO membrane modules 10, 20, and 30 and particularly the FO membrane modules 20 and 30 at rear ends in Embodiment 2 may be maintained to be high. Therefore, recovery efficiency in the FO membrane modules 20 and 30 is remarkably improved, and furthermore, overall recovery efficiency in the multiple water recovery process is remarkably improved in Embodiment 1.

In addition, an outlet flow rate of in-series flow paths for a low concentration solution is larger than the sum of inlet flow rates of each flow path for a high concentration solution. In other words, since a flow rate of the high concentration solution is extremely smaller than that of the low concentration solution, pump energy required for feeding the high concentration solution becomes very small. In addition, inconvenience of recovering water with the high concentration solution is lessened.

In addition, an inlet flow rate of the in-series flow path for a low concentration solution is larger than the sum of inlet flow rates of each flow path for a high concentration solution. In other words, since a flow rate of the high concentration solution is extremely smaller than that of the low concentration solution, pump energy required for feeding the high concentration solution becomes extremely small. In addition, inconvenience of recovering water with the high concentration solution is lessoned.

In addition, when sea water is used as the low concentration solution, water, that is, fresh water from the sea water, is recovered with high recovery efficiency.

In addition, an FO method according to the embodiment moves water from the low concentration solution to the high concentration solution and has an advantage of less contaminating a membrane than an RO method of directly recovering water with the low concentration solution.

Herein, a high concentration solution in the same concentration and at the same flow rate is made to flow in each flow path for a high concentration solution in Embodiment 1, but the concentration and flow rate in the flow paths for a high concentration solution may be adjusted unless the purpose of the present example embodiment is changed.

For example, as the number of steps from an inlet of an in-series flow path for a low concentration solution to an FO membrane module is increased, an osmotic pressure difference becomes smaller, since the low concentration solution in the FO membrane module has a higher concentration. Accordingly, as the number of steps from an inlet of an in-series flow path for a low concentration solution to an FO membrane module is increased, at least either one of concentration and flow rate of a high concentration solution in the FO membrane module is made to be higher. However, the purpose of the present example embodiment is to lower a flow rate of a high concentration solution, but the flow rate of a high concentration solution may be increased, as long as the purpose of the present example embodiment is not deviated from. In addition, when the concentration of the high concentration solution is changed, a different source depending on each concentration needs to be prepared. Accordingly, an osmotic pressure difference in the FO membrane modules 20 and 30 at a rear end is increased.

<3. Embodiment 2>

(Structure of Water Recovery Device)

Figure 2:
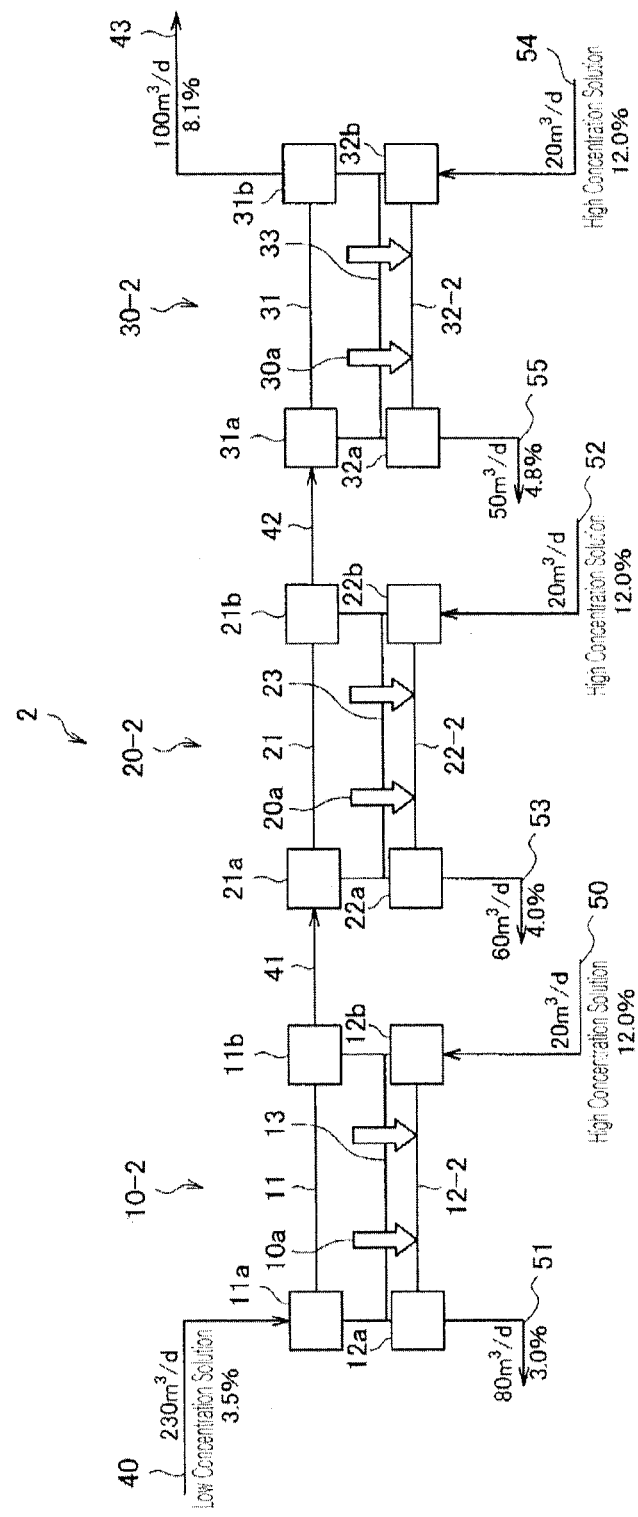
FIG. 2 is a block diagram showing a multiple structure of a water recovery device according to Embodiment 2.

Referring to FIG. 2, a structure of a water recovery device 2 according to Embodiment 2 is explained.

The water recovery device 2 includes FO membrane modules 10-2, 20-2, and 30-2 substituted for the FO membrane modules 10, 20, and 30 of the water recovery device 1 according to Embodiment 1.

The FO membrane modules 10-2, 20-2, and 30-2 include flow paths 12-2, 22-2, and 32-2 substituted for the flow paths 12, 22, and 32 for a high concentration solution of the FO membrane modules 10, 20, and 30.

The flow paths 12-2, 22-2, and 32-2 for a high concentration solution are narrower than the flow paths 11, 21, and 31 for a low concentration solution. Specifically, the flow paths 12-2, 22-2, and 32-2 for a high concentration solution have narrower vertical cross-sections than those of the flow paths 11, 21, and 31 for a low concentration solution. Accordingly, the flow paths 12-2, 22-2, and 32-2 for a high concentration solution speed up flux of a high concentration solution compared with those of Embodiment 1. Accordingly, a shear force in the high concentration solution is improved, and thus concentration polarization in the high concentration solution is decreased.

In other words, as described above, since a flow rate of the high concentration solution is lower than a flow rate of the low concentration solution, concentration polarization in the high concentration solution may occur. Accordingly, Embodiment 2 increases a flux in the flow paths 12-2, 22-2, and 32-2 for a high concentration solution by making the flow paths 12-2, 22-2, and 32-2 for a high concentration solution narrower than the flow paths 11, 21, and 31 for a low concentration solution. Therefore, since a shear force in the high concentration solution is improved, concentration polarization in the high concentration solution is decreased.

The FO membrane modules 10, 20, and 30 may be down-sized in Embodiment 2. The flow path for a low concentration solution is made to be narrow and thus to increase a flux in the flow path for a low concentration solution. However, since the narrow flow path for a low concentration solution is to make each FO membrane module small, the number of FO membrane modules is huge. Accordingly, the water recovery device 2 according to Embodiment 2 has sharply deteriorated efficiency.

A multiple water recovery process according to Embodiment 2 is the same as that of Embodiment 1 and thus will not be illustrated here.

Example

As shown in FIG. 2, a low concentration solution in a concentration of 3.5 mass % flows in the flow path 11 at a flow rate of 230 m³/day. On the other hand, a high concentration solution in a concentration of 12.0 mass % flows in each of the flow paths 12-2, 22-2, and 32-2 at a flow rate of 20 m³/day. Herein, the vertical cross-section of the flow path for a low concentration solution and the vertical cross-section of the flow path for a high concentration solution have a ratio of 20:1 in each of the FO membrane modules 10-2, 20-2, and 30-2. The FO membrane is the same as that of the example in Embodiment 1. As a result, a low concentration solution in a concentration of 8.1 mass % is released from the flow path 11 at a flow rate of 100 m³/day.

On the other hand, a high concentration solution in a concentration of 3.0 mass % is released from the flow path 12-2 at a flow rate 80 m3/day.

A high concentration solution in a concentration of 4.0 mass % is released from the flow path 22-2 at a flow rate 60 m³/day.

The flow path 32-2 for a high concentration solution releases a high concentration solution in a concentration of 4.8 mass % at a flow rate of 50 m³/day.

In this way, each of the FO membrane modules 10-2, 20-2, and 30-2 shows higher water recovery efficiency than the FO membrane modules of the example in Embodiment 1, and thus concentration polarization has less influence thereon.

Accordingly, since the flow paths 12-2, 22-2, and 32-2 for a high concentration solution are narrower than the flow paths 11, 21, and 31 for a low concentration solution in the second example, a flux of a high concentration solution in the flow paths 12-2, 22-2, and 32-2 for a high concentration solution is improved, and furthermore, concentration polarization in the high concentration solution is lessened.

<4. Embodiment 3>

(Structure of Water Recovery Device)

Figure 3:
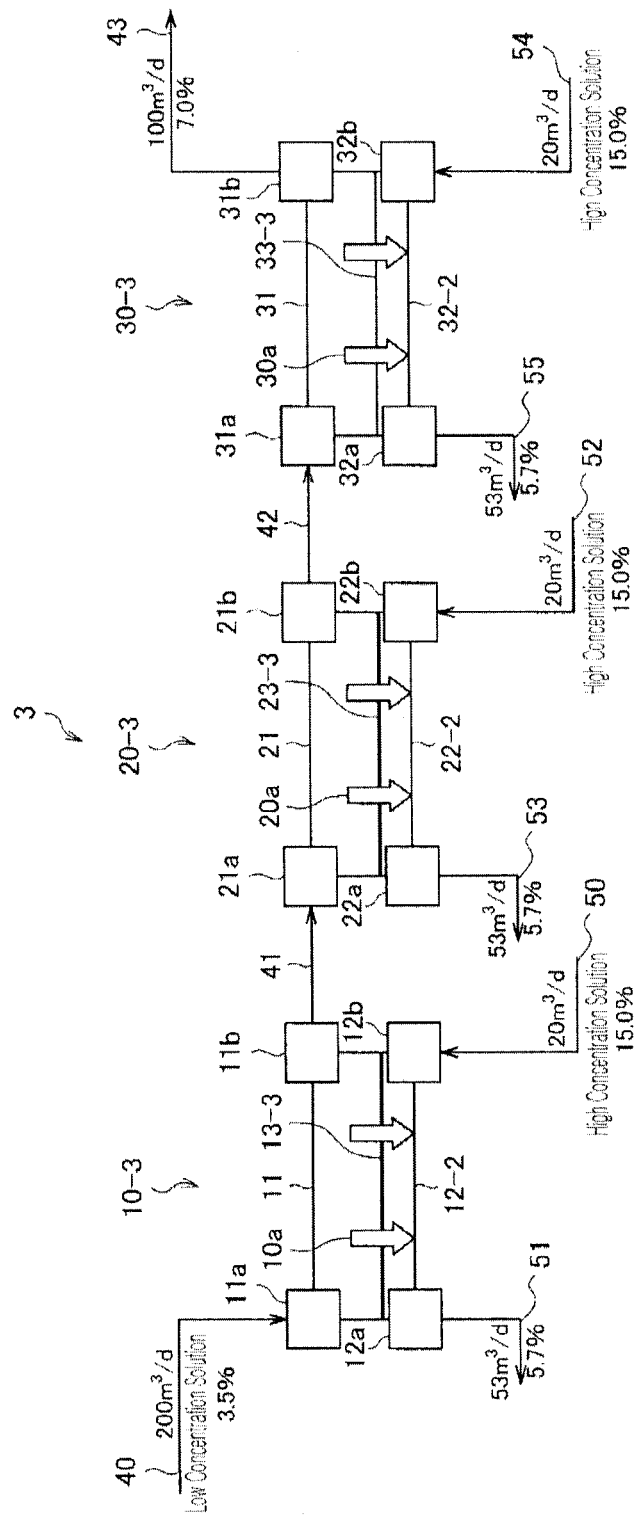
FIG. 3 is a block diagram showing a multiple structure of a water recovery device according to Embodiment 3.

Referring to FIG. 3, a structure of a water recovery device 3 according to Embodiment 3 is explained.

The water recovery device 3 includes FO membrane modules 10-3, 20-3, and 30-3 substituted for the FO membrane modules 10-2, 20-2, and 30-2 in the water recovery device 2 according to Embodiment 2.

The FO membrane modules 10-3, 20-3, and 30-3 include FO membranes 13-3, 23-3, and 33-3 substituted for the FO membranes 13, 23, and 33 of the FO membrane modules 10-2, 20-2, and 30-2.

The FO membranes 13-3, 23-3, and 33-3 have a higher permeability coefficient, as the number of steps from an inlet of an in-series flow path for a low concentration solution to the FO membrane module is larger. In other words, the FO membrane 13-3 has the lowest permeability coefficient, and the FO membrane 33-3 has the highest permeability coefficient. That is, the FO membrane module 10 passes water with the most difficulty, and the FO membrane module 30 most easily passes water.

A permeability coefficient difference is provided as a thickness of an FO membrane in FIG. 3. The thicker the FO membrane is, the lower the permeability coefficient it has.

In other words, as described above, as the number of steps from an inlet of an in-series flow path for a low concentration solution to an FO membrane module is smaller, an osmotic pressure difference in the FO membrane module is larger. Specifically, the osmotic pressure difference in the FO membrane module 10-3 is the largest, and the osmotic pressure difference in the FO membrane module 30-3 is the smallest. Accordingly, when FO membranes having the same permeability coefficient are used in each FO membrane module as in Embodiment 1, a large amount of water is recovered through the FO membrane module 10-3, while a small amount of water is recovered through the FO membrane module 30-3 compared with the FO membrane module 10-3. In addition, an FO membrane in the FO membrane module 10-3 is highly loaded and easily deteriorated.

Accordingly, a permeability coefficient of the FO membranes 13-3, 23-3, and 33-3 is higher as the number of steps from an inlet of an in-series flow path for a low concentration solution to an FO membrane module is larger in Embodiment 3. Accordingly, the amount of water passing the FO membranes 13-3, 23-3, and 33-3, that is, the load of the water, is standardized, and furthermore, a deterioration speed of the FO membranes is standardized. Therefore, each of the FO membrane 13-3, 23-3, and 33-3 is exchanged at a standardized time, and thus inconvenience for maintenance and repair is lessened.

The FO membrane 13-3 may include, for example, an SW series RO membrane made by DOW.

The FO membrane 23-3 may include, for example, a BW series RO membrane made by DOW.

The FO membrane 33-3 may include, for example, an HRLE series RO membrane made by DOW.

These RO membranes may be used in an FO membrane mode in the example Embodiments 1 to 3.

A common RO membrane is not mostly optimized for the FO membrane mode and thus may be modified to a have an appropriate module structure for the FO membrane mode. Of course, the RO membrane may be used for the FO membrane without modification.

Example

As an example, in the embodiment shown in FIG. 3, a low concentration solution in a concentration of 3.5 mass % flows in a flow path 11 at a flow rate of 200 m3/day, and a low concentration solution in a concentration of 7.0 mass % is released from the flow path 31 for a low concentration solution at a flow rate of 100 m3/day. A high concentration solution in a concentration of 15.0 mass % flows in each flow path 12-2, 22-2, and 32-2 at a flow rate of 20 m3/day.

From the flow path 12-2, a high concentration solution in a concentration of 5.7 mass % is released at a flow rate of 53 m3/day.

From the flow path 22-2 for a high concentration solution, a high concentration solution in a concentration of 5.7 mass % is released at a flow rate of 53 m3/day.

From the flow path 32-2 for a high concentration solution, a high concentration solution in a concentration of 5.7 mass % is released at a flow rate of 53 m$^3$/day.

A solute in the low and high concentration solutions is the same as shown in FIG. 4, and SW30XLE-440i, BW30HR-440i, and HRLE-440i made by DOW are respectively used as FO membranes 13-3, 23-3, and 33-3.

As shown in this embodiment, the amount of water passing each of the FO membranes 13-3, 23-3, and 33-3, that is, the load of the water, is standardized in the present example embodiment.

Hereinbefore, since the FO membranes 13-3, 23-3, and 33-3 have a higher permeability coefficient as the number of the FO membranes from an inlet of an in-series flow path for a low concentration solution to an FO membrane module is larger, the amount of water passing the FO membranes 13-3, 23-3, and 33-3, that is, the load of the water, is standardized in Embodiment 3.

Example embodiments of the present disclosure have been illustrated in the accompanying drawings, but it should be understood that the present disclosure is not limited thereto. While various examples have been described, it is to be understood that the present disclosure is not limited to the disclosed embodiments, but, on the contrary, is intended to cover various modifications and equivalent arrangements included within the spirit and scope of the appended claims.

For example, in the example embodiments, the number of the FO membrane modules is shown as 3, but the present disclosure is not limited thereto. For example, the number of the FO membrane modules may be 2 or may be 4 or more.

The number of FO membrane modules is determined, for example, by the amount of the low concentration solution.

DESCRIPTION OF SYMBOLS

1, 2, 3: water recovery device
10, 20, 30: FO membrane module
11, 21, 31: flow path for a low concentration solution
12, 22, 32: flow path for a high concentration solution
40 to 43: connecting flow path for a low concentration solution
50 to 55: connecting flow path for a high concentration solution

What is claimed is:

1. A water recovery method comprising:
    inflowing a low concentration solution into an in-series flow path, the low concentration solution including water, the in-series flow path including a plurality of first flow paths coupled in series, and
    inflowing a high concentration solution into a plurality of second flow paths, the high concentration solution in each of the plurality of second flow paths having a same concentration of a draw solute, each of the plurality of second flow paths for the high concentration solution being connected to a segment of the in-series flow path for the low concentration solution with a respective semipermeable membrane that is interposed between the in-series flow path and each of the plurality of second flow paths such that a net flow of water passes through the respective semipermeable membrane of the semipermeable membranes from the low concentration solution to the high concentration solution via forward osmosis while the low concentration solution and the high concentration solution flow in opposite directions, the semipermeable membranes being configured such that each of an upstream semipermeable membrane is thicker than a downstream semipermeable membrane relative to an inlet of the in-series flow path, each of the plurality of second flow paths being in parallel and having a same inlet flow rate.

2. The water recovery method of claim 1, wherein the inflowing a low concentration solution and the inflowing a high concentration solution includes an outlet flow rate of the in-series flow path for the low concentration solution being higher than a sum of an inlet flow rate of each of the plurality of second flow paths for the high concentration solution.

3. The water recovery method of claim 1, wherein the inflowing a low concentration solution and the inflowing a high concentration solution includes an inlet flow rate of the in-series flow path for the low concentration solution being higher than a sum of an inlet flow rate of each of the plurality of second flow paths for the high concentration solution.

4. The water recovery method of claim 1, wherein the inflowing a low concentration solution and the inflowing a high concentration solution includes the plurality of second flow paths for the high concentration solution being narrower than the in-series flow path for the low concentration solution.

5. The water recovery method of claim 1, wherein the inflowing a low concentration solution and the inflowing a high concentration solution includes each of the semipermeable membranes being arranged such that a downstream semipermeable membrane has a higher permeability coefficient for the water than an upstream semipermeable membrane relative to an inlet of the in-series flow path.

6. The water recovery method of claim 1, wherein the inflowing a low concentration solution includes the low concentration solution being sea water.

7. The water recovery method of claim 2, wherein the inflowing a low concentration solution and the inflowing a high concentration solution includes an inlet flow rate of the in-series flow path for the low concentration solution being higher than a sum of an inlet flow rate of each of the plurality of second flow paths for the high concentration solution.

8. The water recovery method of claim 2, wherein the inflowing a low concentration solution and the inflowing a high concentration solution includes the plurality of second flow paths for the high concentration solution being narrower than the in-series flow path for the low concentration solution.

9. The water recovery method of claim 3, wherein the inflowing a low concentration solution and the inflowing a high concentration solution includes the plurality of second flow paths for the high concentration solution being narrower than the in-series flow path for the low concentration solution.

10. The water recovery method of claim 2, wherein the inflowing a low concentration solution and the inflowing a high concentration solution includes each of the semipermeable membranes being arranged such that a downstream semipermeable membrane has a higher permeability coefficient for the water than an upstream semipermeable membrane relative to an inlet of the in-series flow path.

11. The water recovery method of claim 3, wherein the inflowing a low concentration solution and the inflowing a high concentration solution includes each of the semipermeable membranes being arranged such that a downstream semipermeable membrane has a higher permeability coefficient for the water than an upstream semipermeable membrane relative to an inlet of the in-series flow path.

12. The water recovery method of claim 4, wherein the inflowing a low concentration solution and the inflowing a high concentration solution includes each of the semipermeable membranes being arranged such that a downstream semipermeable membrane has a higher permeability coefficient for the water than an upstream semipermeable membrane relative to an inlet of the in-series flow path.

13. The water recovery method of claim 2, wherein the inflowing a low concentration solution includes the low concentration solution being sea water.

14. The water recovery method of claim 3, wherein the inflowing a low concentration solution includes the low concentration solution being sea water.

15. The water recovery method of claim 4, wherein the inflowing a low concentration solution includes the low concentration solution being sea water.

16. The water recovery method of claim 5, wherein the inflowing a low concentration solution includes the low concentration solution being sea water.

17. The water recovery method of claim 1, wherein the plurality of second flow paths for the high concentration solution have a same inlet flow rate.

* * * * *